Aug. 15, 1967 K. PIECHOCKI 3,336,444

SELECTIVE CALL SYSTEM

Filed March 11, 1964 7 Sheets-Sheet 2

Aug. 15, 1967 K. PIECHOCKI 3,336,444

SELECTIVE CALL SYSTEM

Filed March 11, 1964 7 Sheets-Sheet 3

Aug. 15, 1967 K. PIECHOCKI 3,336,444

SELECTIVE CALL SYSTEM

Filed March 11, 1964 7 Sheets-Sheet 6

Aug. 15, 1967 K. PIECHOCKI 3,336,444

SELECTIVE CALL SYSTEM

Filed March 11, 1964 7 Sheets-Sheet 7

3,336,444
SELECTIVE CALL SYSTEM

Kurt Piechocki, Paris, France, assignor to International Standard Electric Corporation, New York, N.Y., a corporation of Delaware Filed Mar. 11, 1964, Ser. No. 351,106
Claims priority, application France, Mar. 12, 1963, 927,685, Patent 1,371,187
5 Claims. (Cl. 179—41)

ABSTRACT OF THE DISCLOSURE

Signalling system and transistorized means for selective calling mobile radio stations from a central station and vice-versa. Call signal for each mobile station comprises a series of $2^n$ binary bits, easy to handle by means of binary counters. Said series includes "1"-value start and stop bits, and the "0" value is steadily transmitted from the central station so long as it is idle. Two musical modulating frequencies are used for said two values. Each mobile receiver is started by every call signal to produce for itself its own call signal, which it compares bit by bit with the received signal, counting the bits that are of same value in both signals to ascertain whether it is being called or not.

This invention relates to selective call systems of the kind used in radiotelephone communication systems between a number of mobile transmitting-receiving stations and a central station, ordinarily a fixed one, and capable of extending, when required, its radiotelephone links to subscribers' stations in a telephone network.

When the number of mobile stations is large, as when a public telephone network is to be extended to private motor-vehicles, the selective call systems using combinations of voice frequencies are found inadequate. One is led, then, to use coded-call systems, as for instance the "SECODE" system of the American Telegraph and Telephone Company, which uses a mechanical step-by-step switch on the receiving side, or equivalent systems employing electronic equipments. All known systems of this latter type have certain drawbacks, particularly as regards identification of a calling mobile station.

This invention offers a system of selective calls in a timed binary code and using electronic equipment, capable of serving a large number of mobile stations, and free from the drawbacks of known systems.

According to a feature of this invention, each mobile station comprises a call-sign generator which starts operating on receipt of the first bit ("start") of a call from the central station and generates, locally, the own call-sign of the mobile station in the same timed code which is used for the selective calls, and a "comparator" which compares all successive bits of the said call-sign with those occupying the same rank in the received selective call, to deliver a call signal when all corresponding bits of both call-signs are of the same binary value. The same generator is used to send out a call to the central station; in this case, it can be used a second time in receiving the call-sign sent out by the central station when this repeats the call-sign received from some calling mobile station.

Another feature of the invention is that the call-sign generator comprises a clock unit, a "composing" unit the elements of which are set, in each mobile station, to assign the required binary value to each bit, and a binary counter which switches the successive bits supplied by the clock unit towards the corresponding elements of the composing unit so as to form the proper call-sign of the station, wherein the successive bits have binary values in accordance with the agreed code.

Another feature of the invention is that the call-sign comparator comprises a binary counter which registers all concordant bits, that is all bits the binary value of which is the same in the received selective call as in the local call-sign, and generates a call signal when the number of concordant pairs is equal to the number of bits comprised in the selective call, or, in other words, when all bits are respectively concordant.

Preferably, selective calls comprise a number of bits which is broadly equal, to a power of two, so as to be adapted to the operation of the above-mentioned binary counters. By "broadly equal" is meant equality save for one or two bits, as regards the invariable binary values of the first and last bits, the method of resetting to the initial condition, etc., as is usual in this technique.

In radiotelephone communication the binary signals are preferably transmitted by modulating the frequency of a carrier wave by two voice frequencies, viz., $f_0$ for the "space" signal "0," and $f_1$ for the "mark" signal "1." According to a feature of the invention, these two voice frequencies, adequately filtered, are applied to two threshold detectors, such as silicon transistors, to which is associated a bi-stable trigger-circuit that remains in the same one of its two possible conditions as long as it does not receive a tripping pulse from the detector of the binary frequency corresponding to the opposite condition. The threshold detectors eliminate spurious signals, and the trigger-circuit maintains one binary condition until a pulse corresponding to the other binary condition is detected.

The communication system here considered in particular is a carrier-current multiplex system in which permutation takes place, after each call, from one channel to the next, irrespective of the destination of the call.

The objects and characteristics of this invention will be more clearly understood from the following description which makes reference to the attached drawings, in which:

FIG. 1 is a block diagram of a mobile transmitter-receiver according to the invention;

Detailed FIGURES 2 through 6 relate to a particular embodiment of the invention, namely:

Figure 4A:
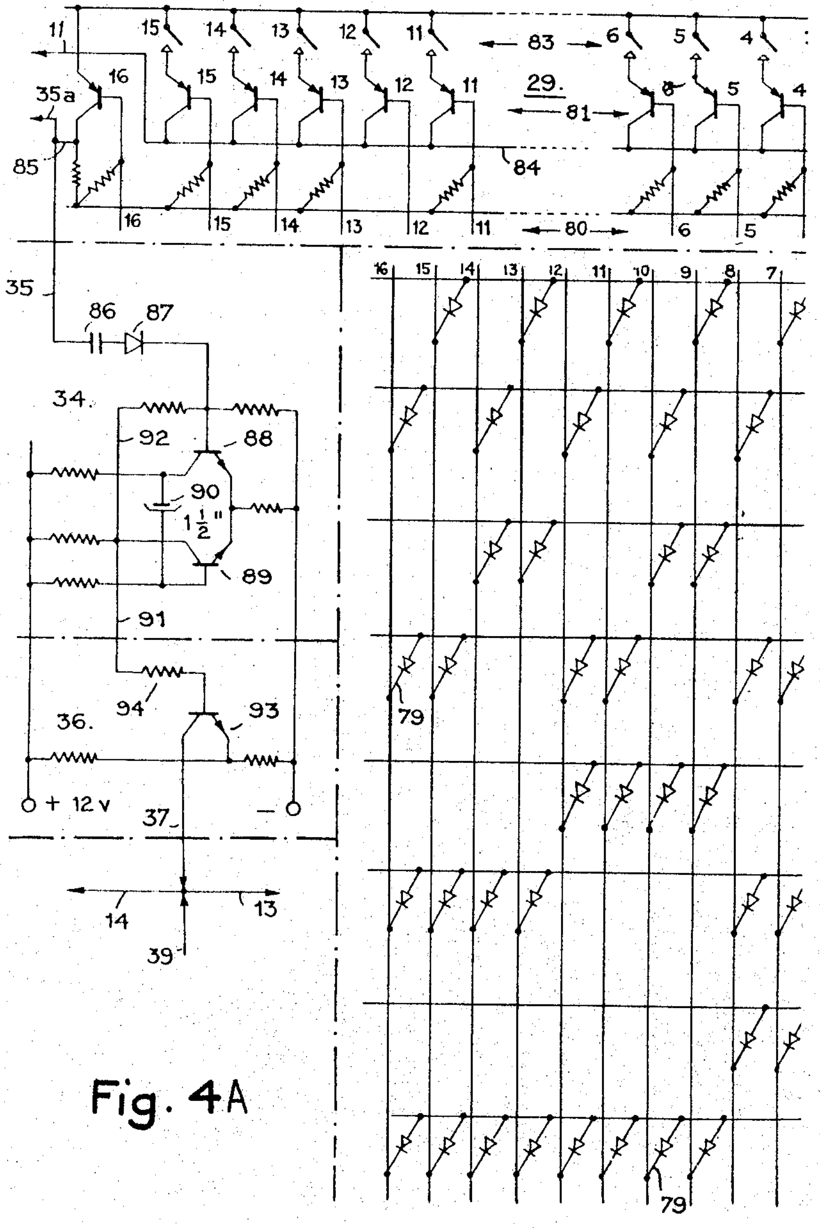
Figure 5:
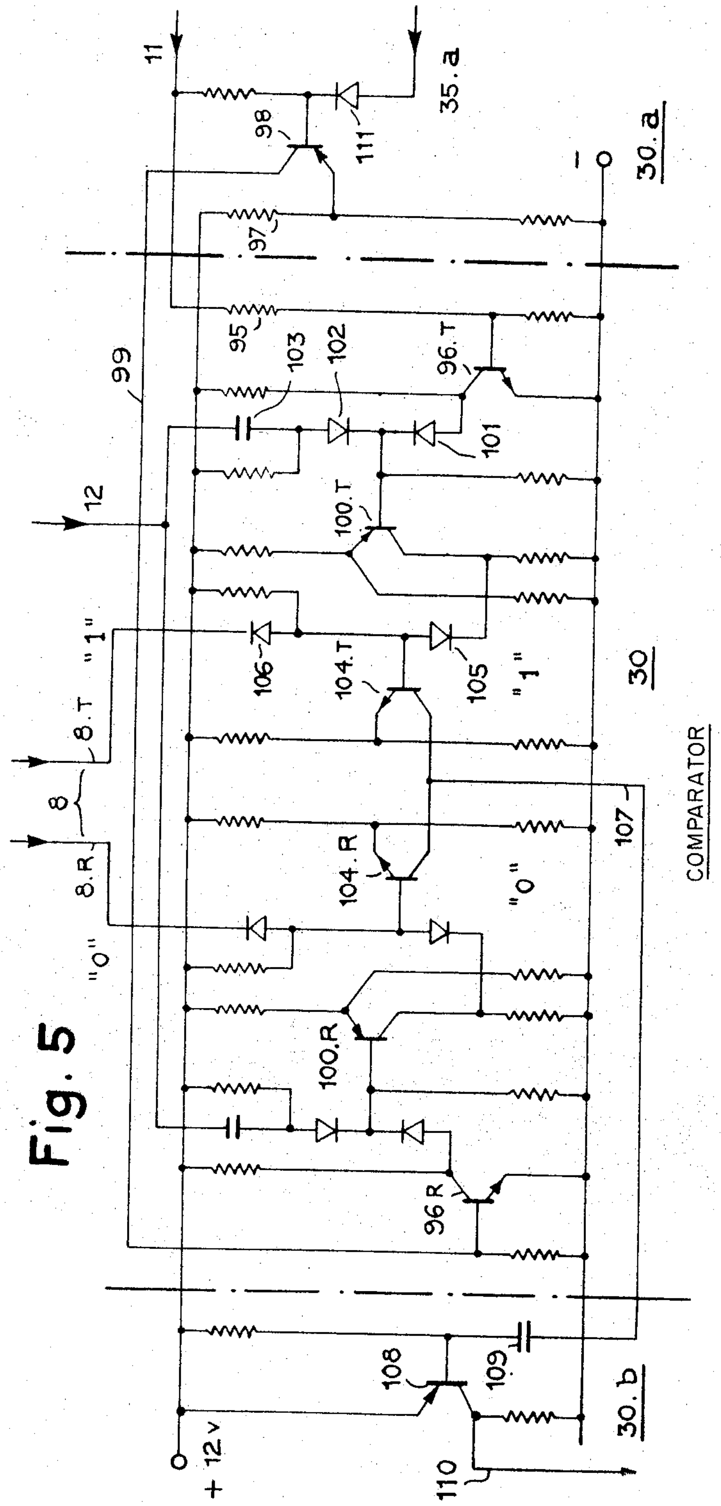

FIGS. 4A and B are schematic diagrams of the local call-sign generator;

FIG. 5 is a schematic diagram of the call-sign comparator; and

Figure 6:
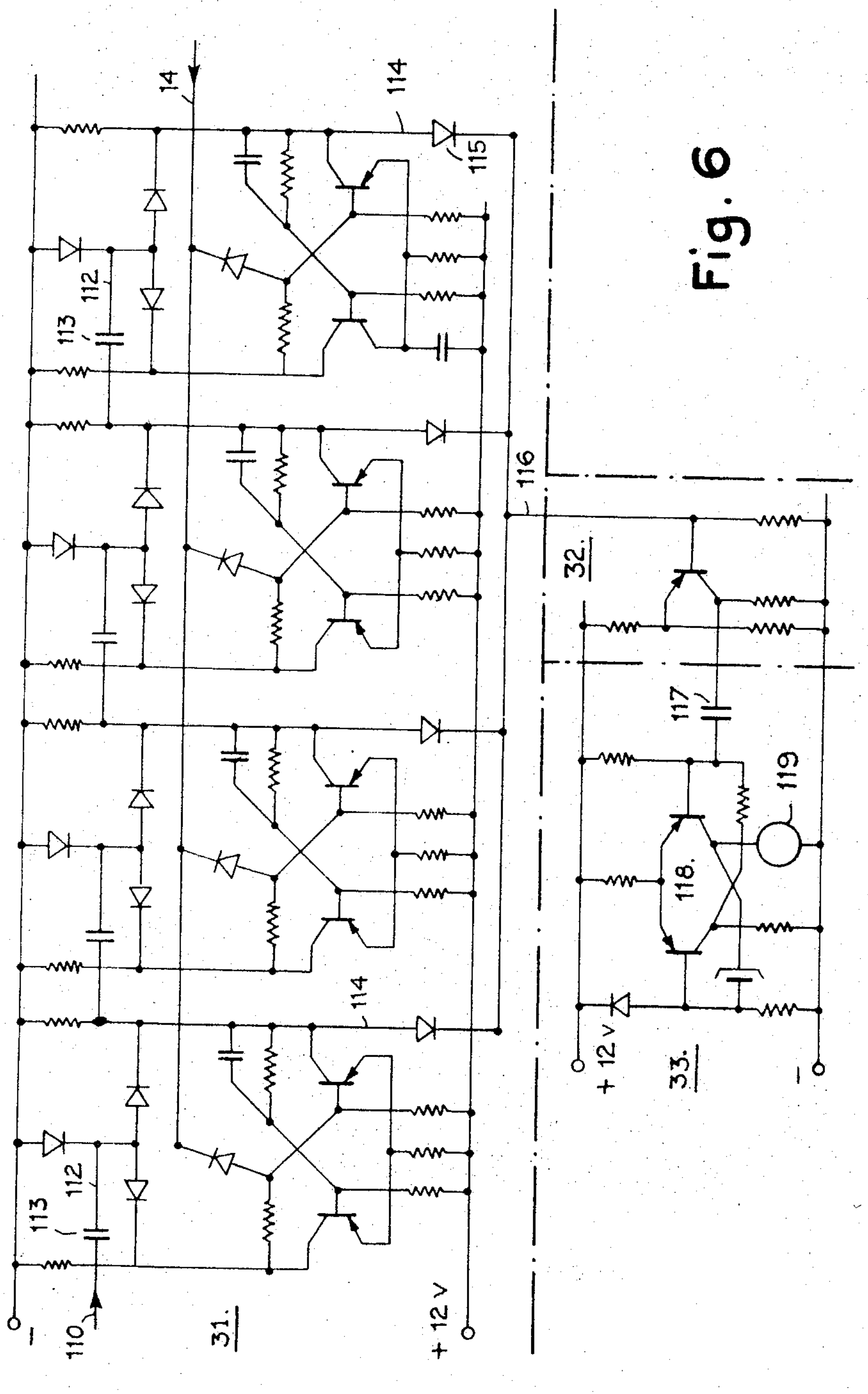

FIG. 6 is a detailed schematic diagram of a counter of concordant bits, and of the call signal circuit.

It will be assumed that the radiotelephone transmission of calls is by frequency-modulation of a carrier wave (any particular channel of a carrier-current multiplex system) by a 1500 c./s. frequency for the "space" signal, corresponding to binary value "0," and by a 600 c./s. frequency for the "mark" signal, corresponding to binary value "1." It will further be assumed that the first and last bits of a selective call are "mark" signals and that the "space" frequency is continually transmitted by the central station when no communication is taking place.

As an example it will be assumed that the selective call comprises 16 bits of 25 ms. duration. The timing (repetition frequency) of the bits is, therefore, 40 c./s. and the duration of a call is 0.4 s. Pulses "1" and "16" always are "mark" signals, the first to start the receiving device and the last to mark the end of the call. Fourteen bits will therefore be significant and will permit specific designation of $2^{14}$ mobile stations, i.e., more than 16,000.

Figure 1:
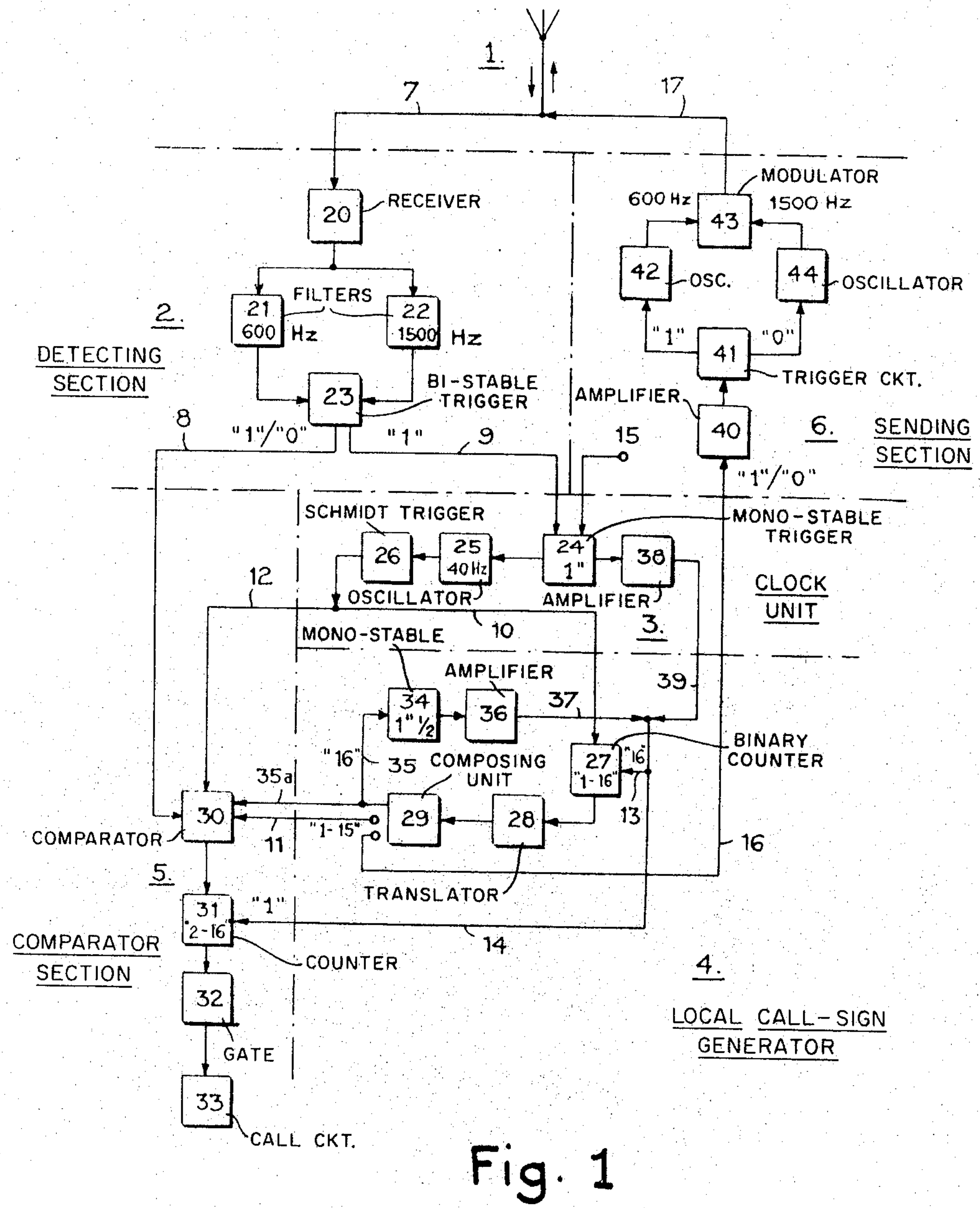

On FIG. 1 will be seen the transmitting and receiving antenna 1, section 2 where received binary signals are detected, section 3 where the local timing is produced, section 4 where the local call-sign is generated, section 5 where comparison takes place that eventually yields a call signal, and section 6 which sends out the call-sign of the mobile station when the latter calls the central station.

Referring to FIG. 1, a summary description will now be given of the operation of the station shown, first in the case of a call sent out by the central station. The central station—not represented—transmits a selective call, that is the call-sign of one of the mobile stations, through the multiplex channel in use at the moment and to which all mobile stations are set that side. The mobile station of FIG. 1 receives this call on antenna 1 and, through 7, in its detecting section 2. The output of this section is a train of binary signals, "1" or "0," depending on the selective call, which is applied through 8 to comparator 5. Besides, and as soon as the call starts, section 2 delivers a pulse "1," through 9, to the clock unit 3. The latter produces a continuous train of pulses, repeated at the same rate as those of the selective call, here assumed to be 40 c./s. This pulse train is applied through 10 to the local call-sign generator 4, where it receives a binary modulation in accordance with the code of the individual call-sign, and is then applied through 11 to comparator 5. On the other hand, the clock section delivers the pulse train direct to comparator 5, through 12, in order that the instants when comparison takes place approximately coincide with the centers of the bits. The comparator compares the successive bits of the call-sign received from the central station, through 8, with those of the call-sign generator locally and applied through 11. If all corresponding bits are identical—in other words, if the number of concordant bits is right the number of bits contained in the call-sign—the mobile station recognizes the call as addressed to itself and initiates a call signal. If such is not the case, the response of the mobile station is merely to pass on to the next multiplex channel in expectation of the communication that will follow the call just considered. The clock device is then stopped, by means which will be described later, and the call-sign generator as well as the comparator are restored to their initial condition through connections 13 and 14.

When the mobile station is calling, the clock device is started, through connection 15 from sending section 6. The call-sign generated in section 4 is applied to sending section 6, through 16, instead of being applied to comparator 5 through 11. In section 6 the carrier wave is modulated by the binary signals of the call-sign and applied to the antenna through 17. The central station receives this call-sign and repeats same. The mobile station that has sent out said call-sign receives the repeated call-sign as already explained, again generating its call-sign to apply same this time to the comparator 5 through 11. Since the other mobile stations change of channel after the call from the calling mobile station and again after the confirmatory call from the central station, both these last said statitons must also change of channel between transmission of the call-sign by the calling mobile station and repetition of this call-sign by the central station.

Again referring to FIG. 1, operation will now be described in a somewhat more detailed manner. The signal received from antenna 1 is demodulated in the receiver proper 20. The receiver applies all signals received to two filters 21 for the "mark" signals at 600 c./s., and 22 for the "space" signals at 1500 c./s. As already said, the filters comprise threshold detectors or amplifiers which eliminate spurious signals. The half-waves which cross over the threshold, after passing through the filter, are applied to a bi-stable trigger-circuit 23. The first "mark" half-wave to reach circuit 23 trips it to the "mark" condition, causing the binary "1" to appear at its outputs 8 and 9. The trigger-circuit remains in this condition, unaffected by following half-waves of identical sign, that is by half-waves which are received from the same filter, during one or several bits of identical value. When the call brings in a signal of opposite value, half-waves of the other voice frequency are applied by the other filter to the other input of trigger-circuit 23, provided they cross over the threshold after passing through the filter. The first of these half-waves will trip the trigger-circuit to its other condition, that is to the "space" condition, since the first bit had initially placed it in the "mark" condition. In this "space" condition, the binary "0" will appear at output 8. The trigger-circuit will remain in this condition, unaffected by following half-waves of identical value received from the same filter during one or several bits, until a signal of the other value appears in the form of a half-wave applied by the other filter to the other input of the trigger-circuit.

At the beginning of a call, the bi-stable trigger-circuit output 8 applies a "1" pulse, through 9, to a monostable trigger-circuit 24 contained in section 3. This trigger-circuit remains in its "mark" conditions for approximately one second, and then returns to its "space" condition. On being tripped to the "mark" condition, this trigger-circuit starts an oscillator which generates a 40 c./s. wave, and stops it when returning to the "space" condition. A Schmidt triggering circuit 26 transforms this harmonic wave into a continuous train of square pulses of alternate polarities. Connection 10 transfers the pulses to section 4, where peaks derived from these pulses are applied to the input of a binary counter 27. This counter comprises four stages of two-output Eccles-Jordan trigger-circuits. The capacity of counter 27 therefore is $2^4=16$, and, in each of its 16 positions, it gives another marking combination on 4 of the 8 output wires. Each combination thus corresponds to a bit occupying a definite time position, from 1st to 16th, in the train of 16 bits of the code.

The 8 outputs of counter 27 are connected to the 8 inputs of a binary-natural translator 28. This has 16 outputs, each one of which is connected at the corresponding instant of the code since it is multipled on the combination of 4 inputs (out of 8) which are then marked by counter 27. Considered together, devices 27 and 28 thus form a time-division distribution device.

The 16 outputs of translator 28 are connected to the inputs of the 16 elements of composing-unit 29. In the latter, the marking applied to each input (actually, from the 2nd to the 15th) is controlled by separate switches which have been pre-set, in open or closed position, according to the code which constitutes the individual call-sign of the station. For each bit of the code, as determined by the clock unit 3 and counter 27, the composing-unit 29 thus delivers a "space" pulse (or absence of pulse), or a "mark" pulse, so as to compose, step-by-step, the individual call-sign of the station. Through 11, the call-sign (actually, the first 15 pulses) is supplied to the comparator proper, 30, in section 5.

Comparator 30 thus receives, on the one hand, the bits of the selective call, supplied through 8 by the receiving section, and, on the other hand, those of the call-sign supplied through 11 by the generating section 4. It also receives, direct through 12, the pulses of the clock section 3. These pulses, adequately sharpened into peaks, ensure that each bit of the call will be compared with the homologous bit of the local call-sign notwithstanding possible deviations of the rate of the call received from the central station with respect to the local rate.

Whenever the two bits are of identical value the comparator 30 delivers a coincidence signal to a binary counter 31. This also comprises four Eccles-Jordan trigger-circuits and its capacity is $2^4=16$. In the embodiment here considered, this counter starts from initial position "1" and reaches "16" at the fifteenth coincidence. In this position, it marks a gate 32 which actuates a call circuit 33.

The 16th bit of the local call-sign—always a "1"—is supplied by composing-unit 29 to a mono-stable trigger-circuit 34, through 35, instead of to comparator 30 through 11. This occurs at the end of the call, namely, 0.4 s. after the beginning of the call. Trigger-circuit 34 assumes its "mark" condition, in which it remains for about 1.5 s. and then returns to its "space" condition. While in its "mark" condition circuit 34 delivers a marking which, after amplification by 36, is applied through 37, 13, and 14 to counters 27 and 31 which are thus returned to their initial condition "16" for counter 27 and "1" for counter 31) and kept in this state for 1.5 s. No fresh call should, therefore, be received within less than 2 or 2.5 s. after the preceding one. On the other hand, 1 s. after the beginning of the call, the mono-stable trigger-circuit 24 returns to its "space" condition, stops oscillator 25, and delivers a marking which, after amplification by 38, is applied through 39, 13, and 14 to the same counters 27 and 31 to keep them in their initial condition, "16" and "1" respectively. The counters will be ready to operate again when a fresh call will be received, at least 2 s. after the previous one, and will trip circuit 24 to its "mark" condition while trigger-circuit 34 will already have resumed its "space" condition.

In the case of a call sent by the mobile station to the central station, trigger-circuit 24 is placed in the "mark" condition through connection 15 from transmitting section 6. Oscillator 25 and the local call-sign generator are started in the same manner as above. However, the output from composing-unit 29 is switched over from connection 11 (to comparator 30) to connection 16 towards amplifier 40 in section 6. This amplifier applies the call-sign signals to a triggering-circuit 41 with two outputs "1" and "0." By way of output "1," bits "1" of the call-sign apply the output of oscillator 42, at 600 c./s., to modulator 43 of the frequency-modulation transmitter, connected to antenna 1. By way of output "0," bits "0" of the call-sign apply the output of oscillator 44, at 1500 c./s., to the same modulator 43. As in the preceding case, the 16th bit is supplied by composing-unit 29 to trigger-circuit 34 while the transmitting key automatically transmits the "end of call" signal "1," at 600 c./s. The central station then repeats the call-sign it has received and all mobile stations receive this call-sign in the same manner as described above.

Figures 2, 4C:
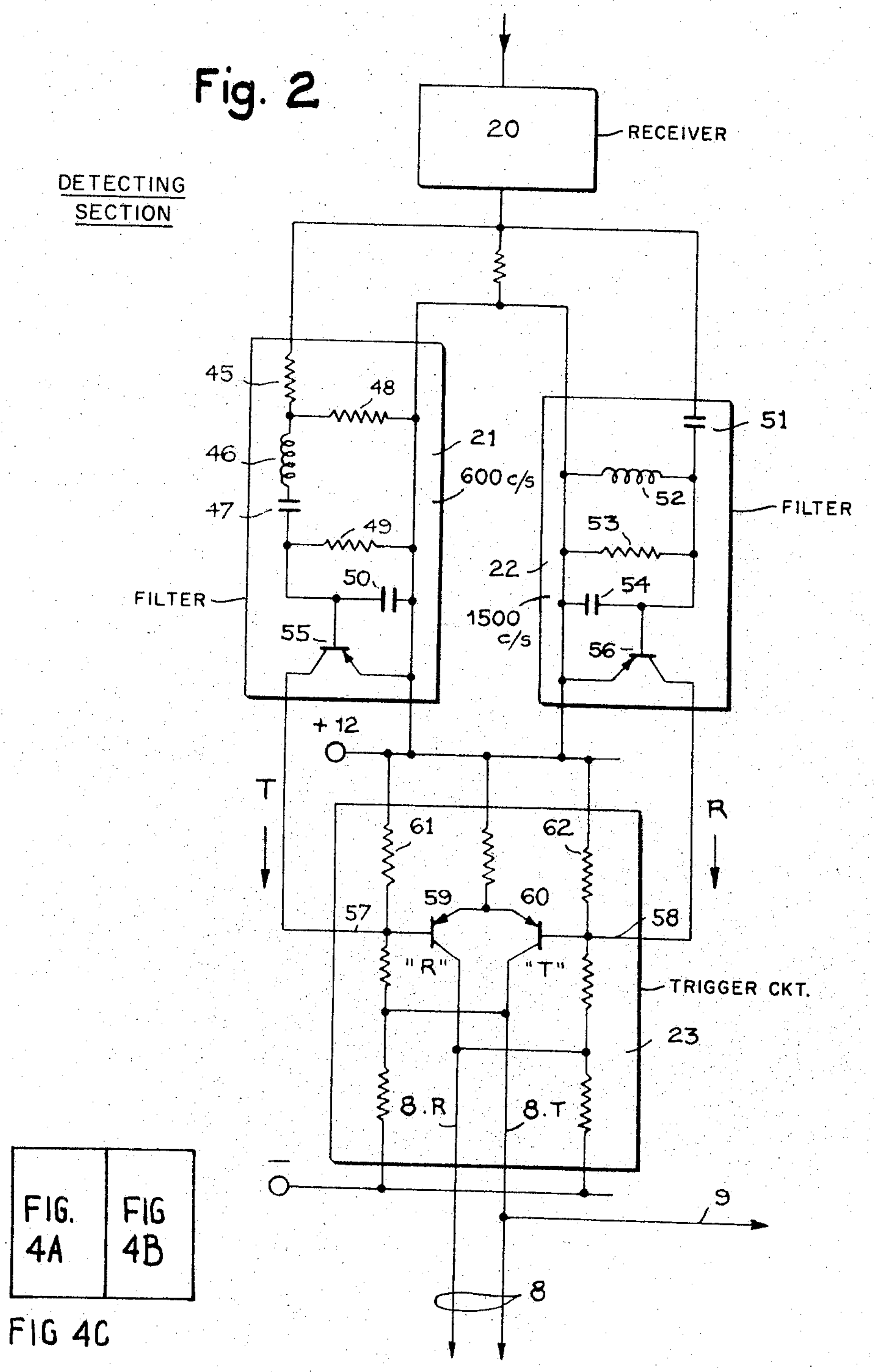
FIG. 2 is a schematic diagram of the circuits detecting the received binary signals.

FIG. 2 illustrates section 2 of the call-receiving system, by means of which the two voice-frequencies are changed into pulses of both signs. As already said, this is accomplished in receiver 20, filters 21 and 22, and trigger-circuit 23. Signals arriving from antenna 1 (FIG. 1) are demodulated in receiver 20, which delivers signals at frequency 600 c./s. ("mark") or 1500 c./s. ("space"). Signals at 600 c./s. are delivered by filter 21 and signals at 1500 c./s. by filter 22. In the embodiment here considered filter 21 comprises, in its series leg, a resistor 45, an inductor 46, and a capacitor 47; in its parallel legs are resistor 48, and resistor 49 in parallel with capacitor 50, the whole being arranged as shown in the drawing. Filter 22 comprises capacitor 51 in series and inductor 52, resistor 53, and capacitor 54 in the parallel legs.

In addition, each filter comprises a parallel leg consisting of a common-emmitter transistor, 55 and 56 respectively. These are silicon transistors with an operating threshold. The base of the transistor associated with a certain filter receives the signals of the voice-frequency passed by this filter. When positive half-waves of the signal are higher than the transistor threshold, conduction takes place from the emitter, maintained at +12 v., to the collector which is connected to the appropriate input, 57 or 58, of trigger-circuit 23.

Trigger-circuit 23 is of a known type and comprises two common-emitter transistors 59 "R" and 60 "T" with their base connected to +12 v. through a resistor 61 and 62, respectively. Other resistors and collector connections complete the circuit. Transistor 55 of filter 21, operating on the "mark" signal at 600 c./s., drives the base of the "space" ("R") transistor 59, of circuit 23, and transistor 56 of filter 22, operating on the "space" signal at 1500 c./s., drives the base of the "mark" ("T") transistor 60, of circuit 23. When trigger-circuit 23 is in the "space" condition, transistor "R" 59 conducts and applies a positive voltage to output wire 8 "R," whilst transistor "T" 60 is cut-off (its base being kept at a positive potential through connection with the collector of transistor "R") and output wire 8 "T" is isolated.

When receiving a "T" signal, as soon as a half-wave of the 600 c./s. filtered current unlocks transistor 55, the latter applies a +12 v. pulse to the base of transistor "R" 59. Transistor 59 is cut-off and unlocks transistor "T" 60 which applies a positive voltage to its output wire 8 "T". This marking transmitted to the base of the "R" transistor through the "T" collector connection keeps the "R" transistor cut-off irrespective of pulses that may still be sent by transistor 55 of the "mark" filter 21. When an "R" signal, filtered by 22 at 1500 c./s. is subsequently received, transistor 56 of the said filter will similarly cut-off the "T" transistor of trigger-circuit 23 and unlock the "R" transistor of said trigger-circuit.

Wire 8 "T" from the collector of the "mark" ("T") transistor 60 is also connected to output wire 9 which goes to section 3 of the equipment, where the local oscillation is generated, in order to initiate operation of the said section as soon as operation of trigger-circuit 23 in the "T" direction indicates the arrival of a "mark" signal. It will have been noted that in the system here considered, the absence of a call from the central station is characterized by the steady transmission of the "space" tone, 1500 c./s. by the said station.

Figure 3:
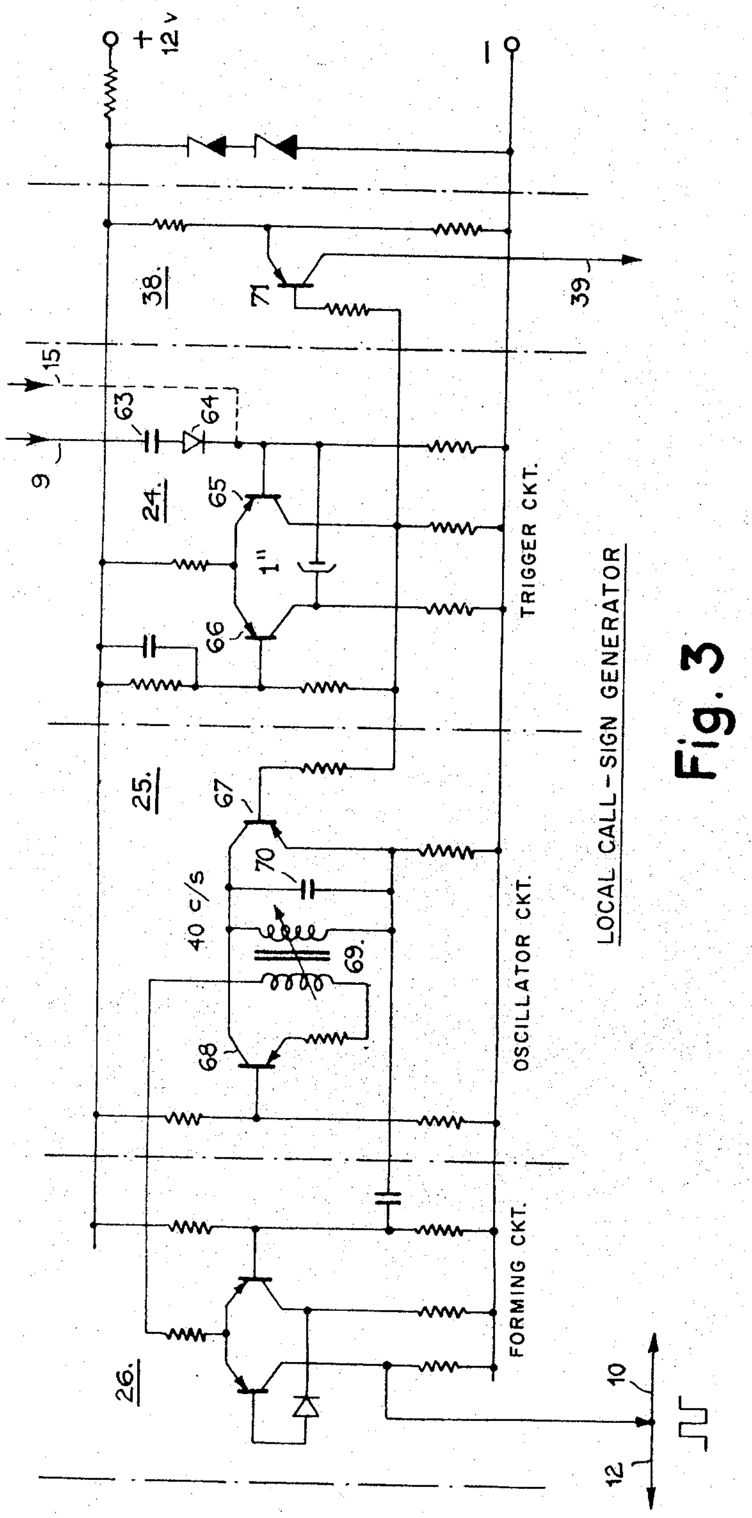
FIG. 3 is a schematic diagram of the local clock generator.

FIG. 3 illustrates circuits 24, 25, 26 and 38 of section 3 where local oscillations are produced. Circuit 24 is a mono-stable trigger-circuit, triggered through connection 9 comprising capacitor 63 and diodes 64 when trigger-circuit 23 is in its "mark" condition after a period of rest (space) of a certain duration (about 2 sec.), viz., at the beginning of a selective call. The mono-stable trigger-circuit 24 will return to its idle position one second after being triggered. It comprises two transistors 65 and 66. Transistor 65 is cut off when the circuit is idle and transistor 66 then conducts. The short negative pulse applied through capacitor 63 unlocks transistor 65. Through the connection from this transistor's collector (which assumes a positive potential) to the base of the other transistor (66) the latter is cut off as well as the control transistor (67) of the oscillator circuit 25. This circuit is the local oscillator, at 40 c./s. of the transmitter-receiver. It is of a well-known type and comprises transistor 68, a feedback inductor 69, and a capacitor 70. In the idle state, the control transistor 67 conducts and short-circuits the tuned circuit 69–70. As soon as transistor 67 is cut off by the positive pulse from the collector of transistor 65, circuit 25 starts oscillating, always with the same phase. It will be noted that the oscillator coupling is very tight, so that starting is practically instantaneous.

Oscillator 25 develops a sine-wave which is changed into a square-wave by forming circuit 26, which is a Schmidt triggering circuit. The square-wave is applied through 12 and 10 to comparator 30 and counter 27 (FIG. 1) respectively. After one second the trigger-circuit 24 will return to its idle condition and again short-circuits the tuned circuit, thus stopping oscillator 25.

Trigger-circuit 24 also controls the marking of connection 39 to binary counters 27 and 31 (FIG. 1). Whenever trigger-circuit 24 is idle, either before or after the one-second working period, the collector of transistor 65 causes conduction through transistor 71 in the amplifier circuit 38, the collector of which positively marks connection 39. It will be seen that this marking returns the counters to, and maintains them in, their initial condition. During the one-second period (i.e., call duration 0.4 s. and 0.6 s. thereafter) connection 39 is not marked and the counters are free to function.

Figure 4B:
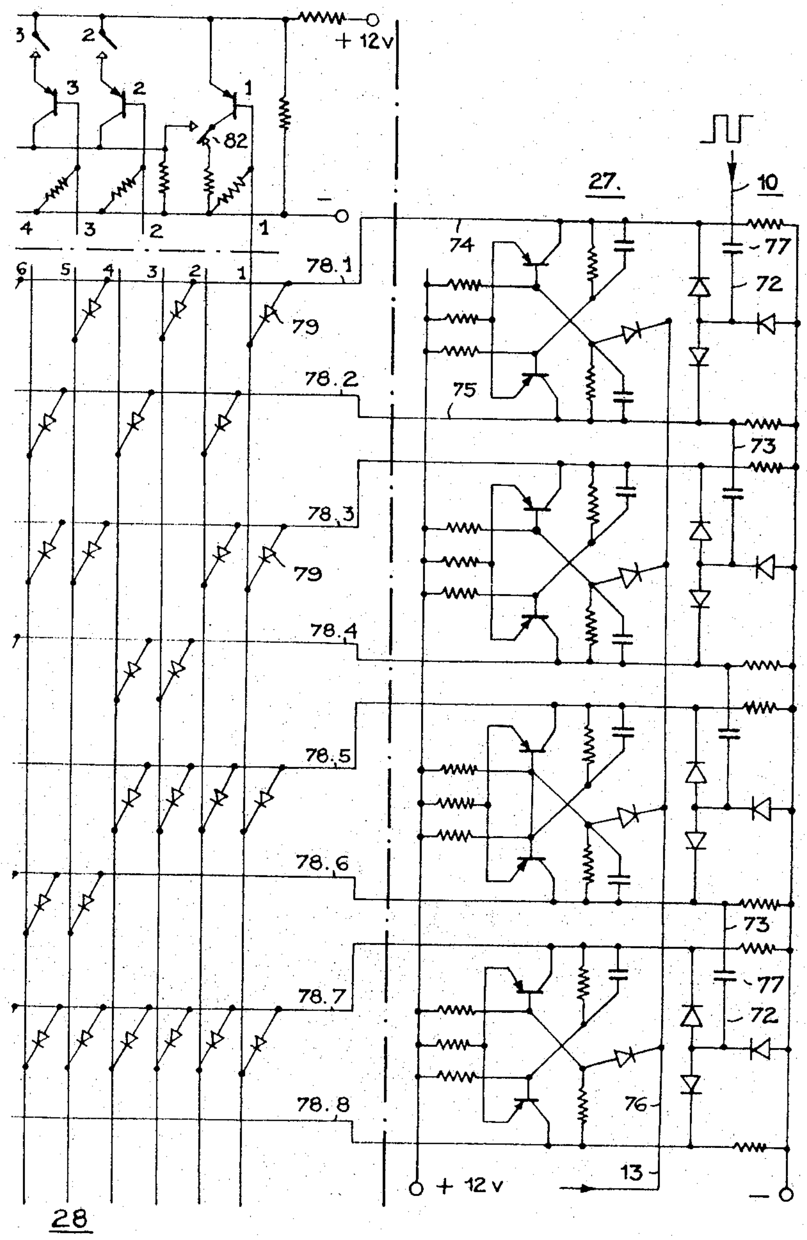

FIG. 4 illustrates circuits 27, 28, 29, 34 and 36 of section 4 in which the individual call-sign of the mobile station is formed. Circuit 27 is a binary counter comprising four Eccles-Jordan trigger-circuits, each with an input 72, a counting output 73, and two marking outputs 74 and 75. Since this counter is not intended to count beyond its capacity the last stage has no counting output. The counter unit also has a common input 76 for resetting to zero, or, rather, to position "16." The square pulses from oscillator 25–26 (FIG. 3) are applied to input 72 of the first stage through capacitor 77 which derives the spikes. The details of Eccles-Jordan trigger-circuits shown in the drawing need not be described since the composition and operation of such circuits are well known.

The marking outputs 74–75 of the four stages of counter 27 are respectively connected to the 8 input wires 78.1–8 of translator 28. The translator is a matrix of diodes 79 which connect the input wires marked by counter 27 according to a 4-element binary code to 16 output wires 80.1–16. Each group of four inputs connected to an output constitutes a "AND" gate (also called "negative AND") to that all four inputs must be marked for their marking to appear at the output. Now, each group of four input wires is the one which the counter marks in one of its 16 conditions, that is for one of the 16 pulses supplied by the local oscillator. The 16 outputs 80.1–16 are thus marked successively, in correspondence with the rhythmical pulses. The counter and translator therefore constitute, as a whole, a time-division distribution device. It will be understood that, in this example, the marking applied by counter 27 to its outputs is, in fact, a lack of positive marking. Thus, when none of the four inputs of a "negative AND" gate has a positive marking, the negative potential appears at the output of the gate and constitutes the output signal which indicates the corresponding bit.

The circuit of composing-unit 29 comprises 16 elements, each one of which is associated with an output of the translator 80.1–16. Each element comprises a transistor 81.1–16 which is unlocked during the corresponding bit by the negative potential which then appears on the associated output 80.1–16. Transistor 81.1 corresponds to the bit "start," always a "mark" signal. Therefore, it is not controlled by the composing-unit as such. However, an inverter switch 82 operating in relation with the operation of the mobile station as a transmitter, and which will not be described here, absorbs the "1" pulse produced by this transisor. Transistors 81.2–15 correspond to the significant bits of the call-sign proper, and each is controlled through a contact 83.2–15 pre-set in the "mark" or "space" position, depending on the value of the corresponding bit in the call-sign of the mobile station. Transistors corresponding to "mark" bits have their contact closed and apply, during the corresponding bits, a positive marking to the common output wire 84 connected to link wire 11. In the "receive" position of inverter 82 the collector of transistor 81.1 is connected to the same output wire 84, in order that bit "1" of the call be a "mark" pulse.

The last transistor, 81.16, always supplies a "mark" pulse for bit "16." However, since this final marking has a particular function (viz., to stop comparison of the selective call with the local call-sign), the collector of transistor 81.16 is connected to a separate output, 85, itself connected with 35 and **35*a*. The effect of this final marking will now be described in relation with stopping counter 27. Connection 35 applies this marking to the 1.5 second mono-stable trigger-circuit, through a capacitor 86 and a diode 87, in the form of a positive peak. Trigger-circuit 34 is similar to trigger-circuit 24 (FIG. 3) and comprises two common-emitter NPN transistors 88 and 89. The positive pulse applied to the base of transistor 88 unlocks this transistor, making its collector negative. Through capacitor 90 which couples the said collector to the base of the other transistor 89 the latter is cut-off a short while later. Its collector becomes positive and applies a positive marking to output 91 of the trigger-circuit; it also cuts off transistor 88 through connection 92 from the said collector to the base of transistor 88. The latter's collector again becomes positive and, through capacitor 90, transistor 89 is again unlocked 1.5 seconds after the control pulse applied through connection 35**.

The positive marking, which appears at the output 91 some time at the end of the selective call and lasts until 1.5 s. after the bit "16," is applied to an amplifier 36. This comprises a common-emitter NPN transistor 93. The positive marking of its base (through resistor 94) unlocks the transistor during the corresponding time. Its collector then applies a negative marking to connection 37, leg 13 of which is connected to the common input, 76, of counter 27. The said marking returns the trigger-circuits of this counter to their idle position "16" (or "0") and holds them in that state during 1.5 s. They are held thereafter by the marking applied in the meanwhile to input 76 by connection 39 from the amplifier, 38, associated with trigger-circuit 24 (FIG. 3). The same markings are applied through leg 14 of connection 37–39 to the comparator's binary counter, section 5 of the equipment, as will be seen later.

FIG. 5 illustrates the comparison circuit 30 which receives the selective call and local call-sign and compares their successive bits "1" or "0." The selective call is received from the two "0" and "1" wires of connection 8 in the form of a positive marking voltage on wire "0" for the "0" signals and a positive marking voltage on wire "1" for the "1" signals. The local call-sign is received from wire 11 in the form of a positive marking voltage for the "1" signals. Moreover, a train of clock pulses is received from wire 12, ensuring that comparison of the bits will take place at their centers. Finally, the 16th pulse "1," of the local call-sign is received from wire **35*a* The comparator proper, 30 of FIG. 5, comprises two symmetrical sections—the left-hand one detects coincidence of bits "0" and the right-hand one detects coincidence of bits "1." To the comparator proper are associated an inverter 30*a* and an output amplifier 30*b***.

Wire 11 is connected through resistor 95 to the base of an NPN input transistor 96.T which conducts whenever a "mark" bit of the call-sign positively marks conductor 11. Through resistor 97 the said conductor is connected an inverter **30*a* to the base of a PNP transistor 98 which conducts when a "space" bit of the call-sign comes in, that applies no positive marking. The collector of this transistor then applies a positive marking to wire 99 which transmits it to the base of an NPN input transistor 96**.R. The latter is thus caused to conduct by the "space" bits of the local call-sign. Once this inversion is effected, the comparator operates symmetrically, i.e., operation is the same in the left-hand section for bits "0" as in the right-hand section for bits "1." Description will now be made of the right-hand section.

The second transistor, 100.T, is controlled by an AND gate comprising two diodes 101–102. Diode 101 is cut off by the negative marking produced on the collector of transistor 96.T when this is unlocked by a "1" bit of the call-sign. Diode 102 is cut off by a sharp negative pulse derived by capacitor 103 from the squarewave received from wire 12 at the center of each bit, when the wave reverses from positive to negative. Transistor 100.T is then unlocked and its collector produces a positive peak at the center of each bit "1" of the local call-sign.

The third transistor 104.T, is of the NPN type and controlled by an "AND" gate comprising two diodes, 105–106. Diode 105 is cut off by the positive peaks from the second transistor, 100.T. Diode 106 is cut off by the positive markings on wire 8.T during bits "1" of the selective call. When both bits (in the selective call and local call-sign) are "mark" signals, transistor 104.T is unlocked and delivers a negative peak at the common output 107 of the comparator. The left-hand section similarly delivers a negative peak at the common output 107 whenever both bits are "space" signals. Thus, there appears on wire 107 as many negative peaks there are pairs of concordant bits in the compared calls, and when the selective call concerns tht mobile station considered, there are 15 coincidences, that is 15 outgoing negative peaks, corresponding to bits of ranks 1 through 15. The peaks from wire 107 are filtered and amplified by amplifier 30*b*, where a PNP transistor 108, is unlocked through capacitor 109 by the front edge of each peak appearing on wire 107 and delivers a positive peak at the output wire 110 of the comparator.

The 16th pulse of the local call-sign, always a "mark" pulse, is received from wire 35*a* and is applied, not to input transistor 96.T but only to inverter-transistor 98 (through decoupling diode 111). This pulse is, therefore, not registered as a coincidence and does not produce any output pulse. Concordance of the selective call and local call-sign is thus characterized by 15 output pulses on wire 110. When the selective call does not concern the mobile station, the number of output pulses is less than 15, although never less than one since the first bit always is a "mark" signal. Wire 110 applies these coincidence pulses to counter 31 of FIGS. 1 and 6.

The coincidence counter 31 is shown on FIG. 6. It is similar to the counter of FIG. 3, comprises four Eccles-Jordan trigger-circuits, and counts up to $2^4=16$. As already mentioned, its initial position is "1" and it reaches position "16" when the comparator of FIG. 5, having registered 15 coincidences, has determined that the selective call concerns the mobile station. The coincidence pulses received from the comparator through wire 110 are applied to input 112 of the first trigger-circuit through capacitor 113. In position "16," the four outputs 114 of the counter are negative; they are connected by diodes 115, the common output of which 116, again constitutes a negative "AND" gate. Output 116 thus becomes negative when the selective call concerns the mobile station. This negative marking causes someway the operation of a calling circuit. The latter is shown on the drawing in the form of an amplifier 32 sending a positive pulse through capacitor 117; the pulse initiates operation of a delayed trigger-circuit 118 (circuit 33) which, for a certain time, develops a signal at 119.

Although the principles of this invention have been described above in connection with a particular embodiment, it will be clearly understood that this was done solely by way of example and that the scope of the invention is not limited thereby.

What is claimed is:

1. A mobile telephone station adapted to receive a timed binary code transmitted by modulation of two wire frequencies and to identify the specific call-sign of said mobile station, comprising:

means including a mono-stable device triggered by a "start" bit of a call for a predetermined time-period covering the duration of the entire call, means including a clock generator controlled by said device to operate during the said time-period, means for generating a local call-sign including a bit counter and a translator adapted to deliver a marking voltage for each bit counted at a corresponding output, a composing device each element of which is associated with the translator output to control said output in accordance with the code of the local call-sign, a comparator for comparing the sign of each bit of the selective call with a corresponding bit provided by the local call-sign generator, and a counter for counting those bits which are concordant to deliver a call marking when the number of concordant bits equals the number of bits in the call, thereby to operate a call circuit.

2. A selective call system as claimed in claim 1, in which the number of bits in the code is equal, in principle, to a power of two and the counters are binary counters of a capacity equal to that power of two.

3. A selective call system substantially as claimed in claim 1, in which there is included another delayed mono-stable device triggered by the last—or "stop"—bit of the call for a time-period longer than that still required by the first mono-stable device to restore to its idle condition and in which both counters are first returned to their initial position by the operation of this second mono-stable device, are then held in the said position, first by this second mono-stable device until it restores to the idle condition, and then by the first mono-stable device, restored in the meanwhile, until a fresh call will trigger again the first mono-stable device.

4. A selective call system substantially as claimed in claim 1, in which means are provided for sending out a call from the mobile station, addressed to a fixed central station, comprising a modulator, and means including the clock generator and the local call-sign generator for controlling the modulator according to the code of the mobile station.

5. A selective call system as claimed in claim 4, in which the mobile station includes means for operating a second time to receive and confirm a call transmitted by a central on receipt of the call of the mobile station.

References Cited

UNITED STATES PATENTS

| | | | |
|---|---|---|---|
| Re. 26,079 | 9/1966 | Cooper | 179—84 |
| 3,046,526 | 7/1962 | Scantlin | 179—84 |
| 3,069,657 | 12/1962 | Green et al. | 343—228 |
| 3,077,577 | 2/1963 | Malone et al. | 179—84 |
| 3,233,221 | 2/1966 | Perlin et al. | 340—168 |

KATHLEEN H. CLAFFY, *Primary Examiner*.

H. ZELLER, *Assistant Examiner*.